United States Patent [19]

Monk et al.

[11] Patent Number: 5,704,640
[45] Date of Patent: Jan. 6, 1998

[54] BONDABLE AUTOIGNITION FOIL

[75] Inventors: David B. Monk, Kaysville; Alan D. Kendrick, Hooper; Mark B. Woodbury, North Salt Lake City, all of Utah

[73] Assignee: Morton International, Inc., Chicago, Ill.

[21] Appl. No.: 641,586

[22] Filed: May 1, 1996

[51] Int. Cl.[6] ............................................. B60R 21/28
[52] U.S. Cl. ...................... 280/741; 280/736; 102/202; 422/165
[58] Field of Search ....................... 280/741, 736; 222/3; 102/530, 202; 422/165, 166

[56] References Cited

U.S. PATENT DOCUMENTS

| 4,380,346 | 4/1983 | Davis et al. |
|---|---|---|
| 4,561,675 | 12/1985 | Adams et al. |
| 4,950,458 | 8/1990 | Cunningham et al. |
| 5,100,174 | 3/1992 | Jasken et al. |
| 5,104,466 | 4/1992 | Allard et al. |
| 5,114,179 | 5/1992 | Emery et al. ............ 280/741 |
| 5,186,491 | 2/1993 | Yoshida et al. |
| 5,299,828 | 4/1994 | Nakajima et al. |
| 5,378,017 | 1/1995 | Lindsey et al. |
| 5,427,030 | 6/1995 | Kidd et al. |
| 5,431,103 | 7/1995 | Hock et al. ............ 280/741 X |
| 5,439,250 | 8/1995 | Kokequchi et al. |
| 5,460,671 | 10/1995 | Khandhadia |
| 5,518,807 | 5/1996 | Chan et al. ............ 428/305.5 |
| 5,533,754 | 7/1996 | Riley ............ 280/741 |

Primary Examiner—Christopher P. Ellis
Attorney, Agent, or Firm—Lawrence I. Field; Gerald K. White

[57] ABSTRACT

An autoignition charge for pyrotechnic automotive airbag inflation devices is provided in the form of a foil of a synthetic polymer or of a metal, having an adhesive on one surface of the foil and an autoignition material on the opposite surface of the foil. Pieces of foil are readily attached to inflator housings at any suitable location and are secured to the housing by the adhesive on one surface of the foil.

4 Claims, 2 Drawing Sheets

BONDABLE AUTOIGNITION FOIL

This invention relates to automotive vehicle pyrotechnic airbag inflation devices. More particularly it relates to the manner in which an autoignition material is provided in such devices. It is applicable to both driver side pyrotechnic airbag inflators and passenger side pyrotechnic airbag inflators.

BACKGROUND OF THE INVENTION

It is known to provide pyrotechnic airbag inflation devices with an autoignition charge, e.g. as described in Adams et al U.S. Pat. No. 4,561,675 issued Dec. 31, 1985.

It is also known to seal each pyrotechnic airbag inflator using foil bonded to the surface of the diffuser in the inflator, e.g. as described in Davis et al U.S. Pat. No. 4,380,346 issued Apr. 19, 1983.

The disclosures in these patents are intended to be incorporated in this specification by this reference as representative of the prior art.

In prior art pyrotechnic airbag inflation devices an autoignition charge is often incorporated into a package which is positioned at one end of a passenger side inflator or at a suitable location in a driver side inflator. The purpose of the autoignition package is to ignite the pyrotechnic inflation charge in the event of a fire when the inflator is in storage prior to being installed in a vehicle or during a fire after it is installed in an automobile. As acknowledged in Nakajima et al U.S. Pat. No. 5,299,828, issued Apr. 5, 1994, heat transfer to the autoignition charge may be delayed if the autoignition package is positioned at a location remote from the fire. In the device shown in that patent the autoignition charge is provided as a coating inside the diffuser. The coating does not cover the ports in the diffuser and hence the contents, and particularly the pyrotechnic inflation charge in the inflator is not sealed from the environment and is exposed to moisture or other constituents in the atmosphere which may adversely affect the performance of the pyrotechnic charge. Furthermore the application of such a coating requires specialized apparatus and complicates the usual operation in which an inflator is assembled.

OBJECTS OF THE INVENTION

One object of the invention is to provide a pyrotechnic inflator with an improved autoignition means which is easy to install.

Another object is to provide an autoignition means which does not require a separate means for retaining it in an inflator.

A further object is to provide an autoignition charge in the form of a foil which may also be used to seal the ports in a pyrotechnic inflator.

Still another object is to provide an autoignition charge in the form of a bondable autoignition foil which comprises a film carrying an adhesive on one surface of the film and an autoignition composition on the opposite surface of the film.

A further object is to simplify the assembly of a pyrotechnic airbag inflator which includes an autoignition charge.

THE INVENTION

In general, known pyrotechnic inflation devices for airbags include an undeployed airbag cushion and means to inflate said cushion. The inflation means includes a pyrotechnic gas-generating material and ignition means for initiating the generation of gas from said pyrotechnic material in order to inflate the airbag cushion. As described in prior art devices the inflation means may also include an autoignition package. The present invention is addressed to an improvement in the autoignition means in such prior art airbag inflation devices.

In the devices of the above noted prior art, the autoignition material is in the form of a separate packet, installed in an appropriate space in the inflation device. In the present invention, the autoignition material is incorporated in a bondable foil which may be attached to any convenient surface of an airbag inflator. Preferably it is attached to a surface which would be exposed to the heat of a bonfire if the inflator was subjected to an accidental fire. Most preferably it may be used to seal an internal component of the inflator from the atmosphere, in place of the foil presently used for this purpose thereby eliminating the necessity of separately providing both a package of autoignition material and a sealing foil as described in U.S. Pat. No. 5,439,250 issued Aug. 8, 1995.

In a preferred form of the present invention, the function of the prior art foil covering and the function of the autoignition charge are combined in such a way that the autoignition charge is exposed for heat transfer more effectively than in the prior art devices, and the need for a separate foil covering and a separate autoignition package is entirely eliminated.

By combining the function of the autoignition system in the inflator with the function of the foil, the inflator is simplified, the process of assembling the inflator is simplified and the efficiency and reliability of the system is enhanced. In addition, any problems associated with the handling of the autoignition charge materials and the installation of the autoignition system are eliminated.

DESCRIPTION OF THE DRAWINGS

The invention will be better understood from the description which follows taken in conjunction with the drawings in which

As shown in FIG. 2, the bondable autoignition foil 10 of this invention comprises a thin film 12 of foil having an autoignition composition 14 disposed on one side of the film 12 and a layer of adhesive 16 bonded to the opposite side of film 12. The autoignition material 14 may consist of particles of black powder or other gun powder type materials or nitro-cellulose base pryrotechnic dispersed in a binder such as a thermoplastic resin. A layer of separating material (not shown) may be provided on the adhesive so that the foil can be stored in rolls and dispensed for installation into the airbag inflators of FIGS. 1 and 4 when they are being assembled.

FIG. 1 is a schematic representation of the housing 20 of a known driver side airbag inflation device, showing various locations at which the foil may be attached, the foil pieces being designated A, B and C. The components of the device such as the pyrotechnic charge, filter screen, diffuser, igniter etc have been omitted as these are conventional and are well known in the art. As shown in FIG. 1, a piece of foil A may be disposed at the base of a well 22 adjacent an outer wall 24 of a driver's side inflator housing 20 such as one shown in Adams et al patent noted above. It will be evident that the foil may be attached to any other suitable surface of the inflator, including internal surfaces which may be perforated or ported. Thus in FIG. 1 foil 10 may line the bottom of well 22. The adhesive layer 16 secures the foil B to an internal surface 26 of an airbag inflator housing with the foil covering ports 28 in wall 26, through which gas generated from the pyrotechnic charge (not shown) flows toward an airbag cushion in the usual way as described in the above noted Adams patent. The adhesive backed foil C may be installed on the vertical wall 29 of the diffuser annulus within which the pyrotechnic charge is disposed.

In FIG. 3 the foil A covers the ports 30 in an igniter tube housing 32 in a passenger side inflator.

It is also possible to locate pieces of the autoignition foil in more than a single location in the inflator. For example foil could be on both an endwall and on another surface of the inflator housing.

Figure 1:
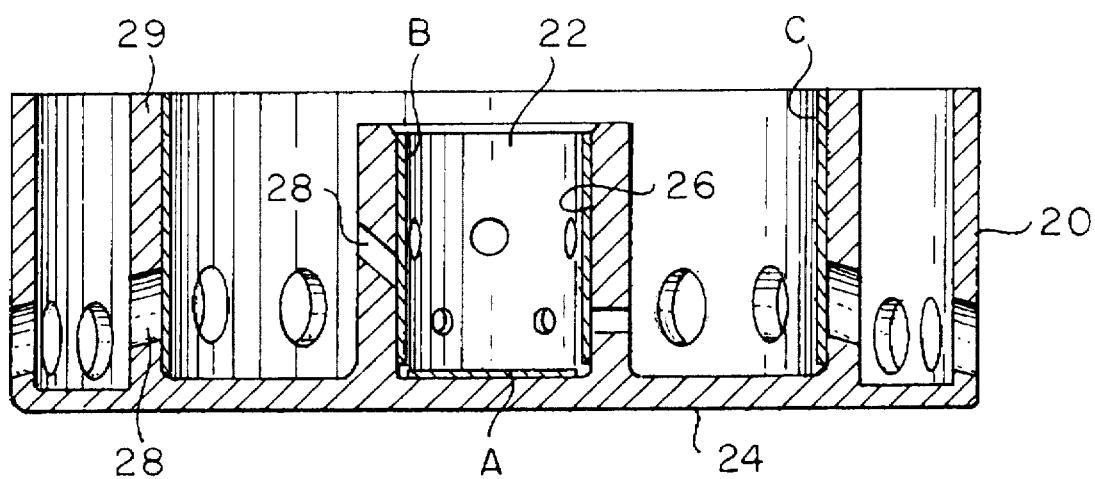
FIG. 1 is a schematic view of a driver side airbag inflator in which the autoignition foil of the present invention is installed, showing various locations in which the foil may be installed.
Figure 2:
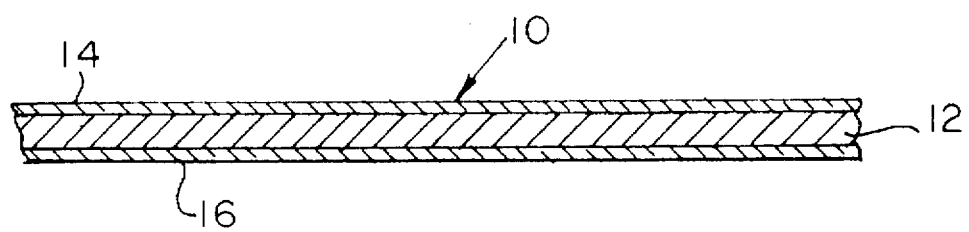
FIG. 2 is a fragmentary sectional view showing the foil of the invention.
Figure 3:
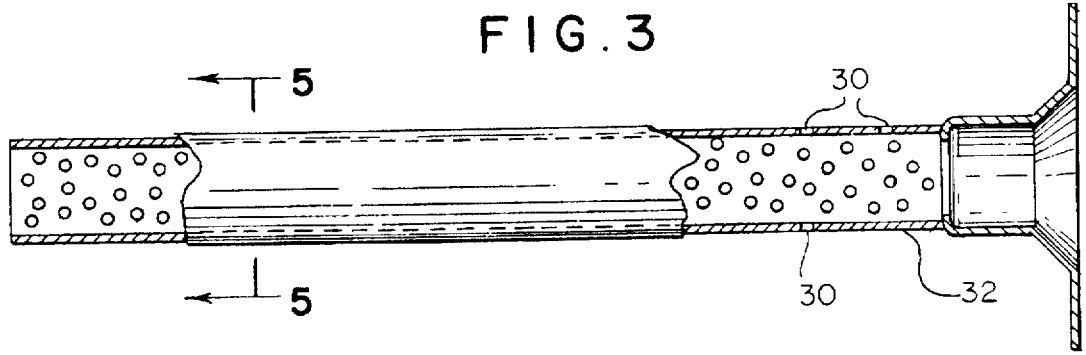
FIGS. 3 and 4 are schematic views of passenger side airbag inflators with the bondable autoignition foil of the present invention.
Figure 4:
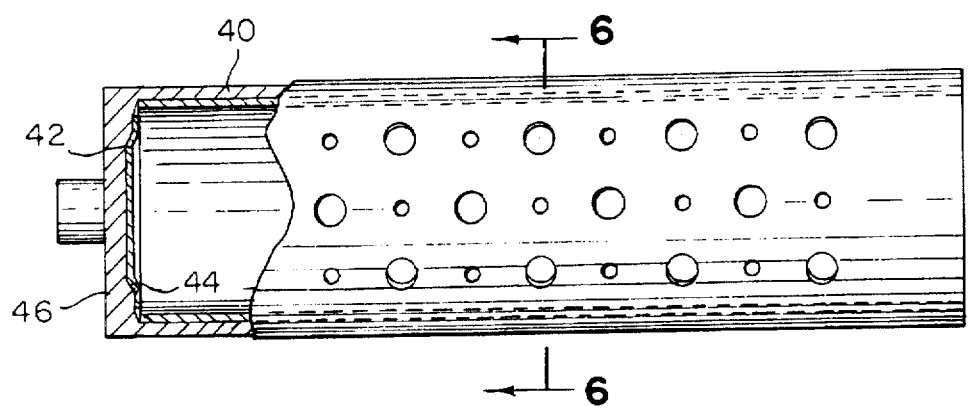
Figure 5:
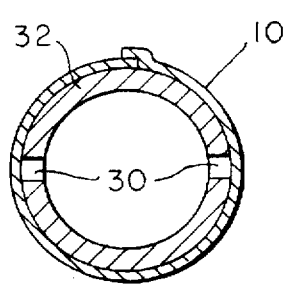
FIG. 5 is a section on plane 5—5 of FIG. 3.
Figure 6:
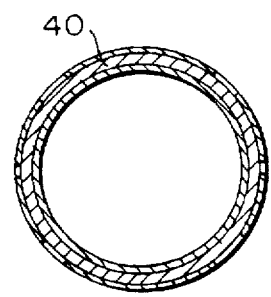
FIG. 6 is a section on plane 6—6 of FIG. 4.

In FIG. 4, a passenger side inflator housing 40 provided with autoignition foil piece 42 adhered within a recess 44 in an endwall 46 of the inflator housing 40.

It will be seen that by the use of an adhesive backed foil to carry the autoignition charge assembly of the inflator is simplified, less space is required and a weight saving may be achieved.

Having now described preferred embodiments of the invention it is not intended that it be limited except as may be required by the appended claims.

We claim:

1. In an automotive airbag inflation device, a bondable autoignition foil comprising a carrier film, a thin layer of an adhesive adhered to a first face of said film and a thin coating of an autoignition composition on a second face, opposite said first face of said film.

2. The invention of claim 1 in which the bondable foil is adhered to a wall in said airbag inflation device.

3. The invention of claim 2 in which said foil is adhered to an inner face of an outer wall of a housing for said airbag inflation device.

4. The invention of claim 1 wherein said airbag inflation device includes a casing in which there are apertures and said foil is adhered to said casing and is disposed so as to cover said apertures.

* * * * *